United States Patent
Herrmann

(10) Patent No.: US 6,209,891 B1
(45) Date of Patent: Apr. 3, 2001

(54) WORKSEAT CART

(76) Inventor: Guy J. Herrmann, 8 Buck Board Ridge, Bethel, CT (US) 06801

( * ) Notice: Subject to any disclaimer, the term of this patent is extended or adjusted under 35 U.S.C. 154(b) by 0 days.

(21) Appl. No.: 09/521,534

(22) Filed: Mar. 7, 2000

(51) Int. Cl.[7] ............................... B62B 3/04; B62B 3/10; A47G 23/02
(52) U.S. Cl. .................... 280/32.6; 280/79.2; 280/79.5
(58) Field of Search ................. 280/62, 32.6, 47.131, 280/47.23, 47.24, 47.26, 47.34, 79.2, 79.5, 79.6, 2; 248/146, 152, 154, 127, 346, 678; 220/20, 69, 70, 90; 403/165, 361

(56) References Cited

U.S. PATENT DOCUMENTS

| | | | |
|---|---|---|---|
| 2,321,981 | * | 6/1943 | Bowers .................................. 211/71 |
| 3,528,676 | * | 9/1970 | Marcandalli ........................ 280/79.2 |
| 3,688,939 | * | 9/1972 | Beckers ............................... 206/591 |
| 4,890,807 | * | 1/1990 | Desjardins .......................... 248/146 |
| 4,998,696 | * | 3/1991 | Desjardins .......................... 248/146 |
| 5,806,867 | * | 9/1998 | Hampton ........................... 280/47.34 |
| 6,116,625 | * | 9/2000 | Tesch ................................. 280/79.11 |
| 6,128,853 | * | 10/2000 | Klonel et al. ............................ 47/39 |

\* cited by examiner

Primary Examiner—Brian L. Johnson
Assistant Examiner—Bridget Avery

(57) ABSTRACT

A movable workseat cart assembly for adapting a bucket-type container to be used as a seat with an accompanying equipment tray for a workman. The assembly includes a unitary body member having a receptacle for a bucket, a partitioned equipment retainer tray surrounding the bucket receptacle, a peripheral skirt surrounding the equipment tray, and swivel wheel assemblies that are positioned between the peripheral skirt and the bucket receptacle. The mentioned elements of the overall assembly are positioned relative to each other so as to maintain a low center of gravity, and to allow the lower edge of the skirt to sweep away debris that might otherwise become lodged under and damage the bottom of the bucket receptacle. The bucket receptacle and the peripheral skirt are connected to each other by an integral spanning web extending between them. Portions of the peripheral skirt and portions of the bucket receptacle project above the surface of the spanning web to serve as partition wall elements that together with the web define separate equipment tray sections for retaining parts and equipment. Additional projections above the upper surfaces of the cart are provided for telescopic mating with receptacles that exist in other forms of containers generally available in the market place.

8 Claims, 6 Drawing Sheets

WORKSEAT CART

BACKGROUND OF THE INVENTION

This invention relates generally to wheeled supports for containers and the like, and more specifically relates to a movable workseat cart that is particularly adapted to be used, in conjunction with a bucket, as a movable seat and implement tray for a workman in a work environment.

Wheeled supports for containers, commonly called dollies, are well known in the prior art. For the most part, the prior art support devices have been intended for use in connection with trash containers or containers for ornamental plants whether living or artificial. Such prior art applications generally serve merely as mechanisms for attaching caster-like wheels to a container so that the container may be pushed or pulled from place to place. In the prior art devices, wheels are coupled to the container variously by attaching the wheels to a base member, and the base member includes a projection or a recess for coupling the base member to the container. These prior art devices do not, however, anticipate or accommodate the unique requirements that are met by this invention, namely: supporting a workman together with a complement of related tools and equipment, safely and in a freely mobile manner on the floor of an often littered work environment. The present invention identifies and satisfies the variety of needs associated with these requirements.

BRIEF SUMMARY OF THE INVENTION

Accordingly, it is an object of this invention to provide means for accommodating a container so as to support the combined weight of a seated workman and his or her related equipment while concurrently positioning the equipment for ready access;

Another object of this invention is the provision of a seating cart having a low center of gravity to assure the safety of a workman who propels the cart by foot while seated on a container mounted on the cart;

Still another object of this invention is the provision of a seating cart that maintains maximum stability together with a low center of gravity while occupying a minimum of floor space;

And yet another object of this invention is the provision of a seating cart that precludes interference with the underside of the cart and obstruction of the wheels by most debris that may be strewn on the floor of a work environment.

These and other and further objects, features and advantages of the present invention will be made obvious to those having skill in this art by reference to the following specification and claims, and to the accompanying drawings, in which:

DETAILED DESCRIPTION OF THE INVENTION

Figure 1:
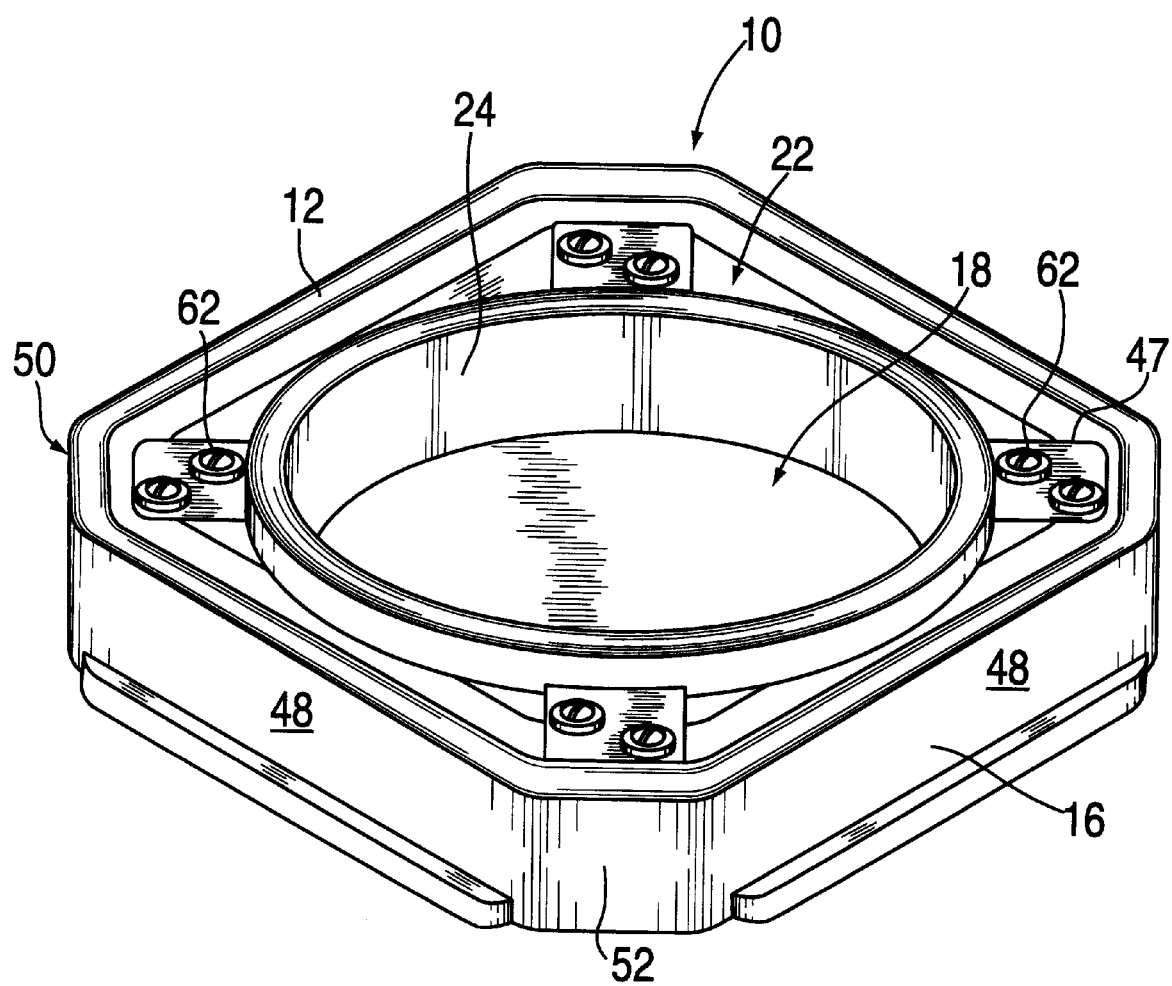
FIG. 1 is a pictorial representation of a wheeled cart in accordance with this invention, shown without a container mounted thereon.
Figure 2:
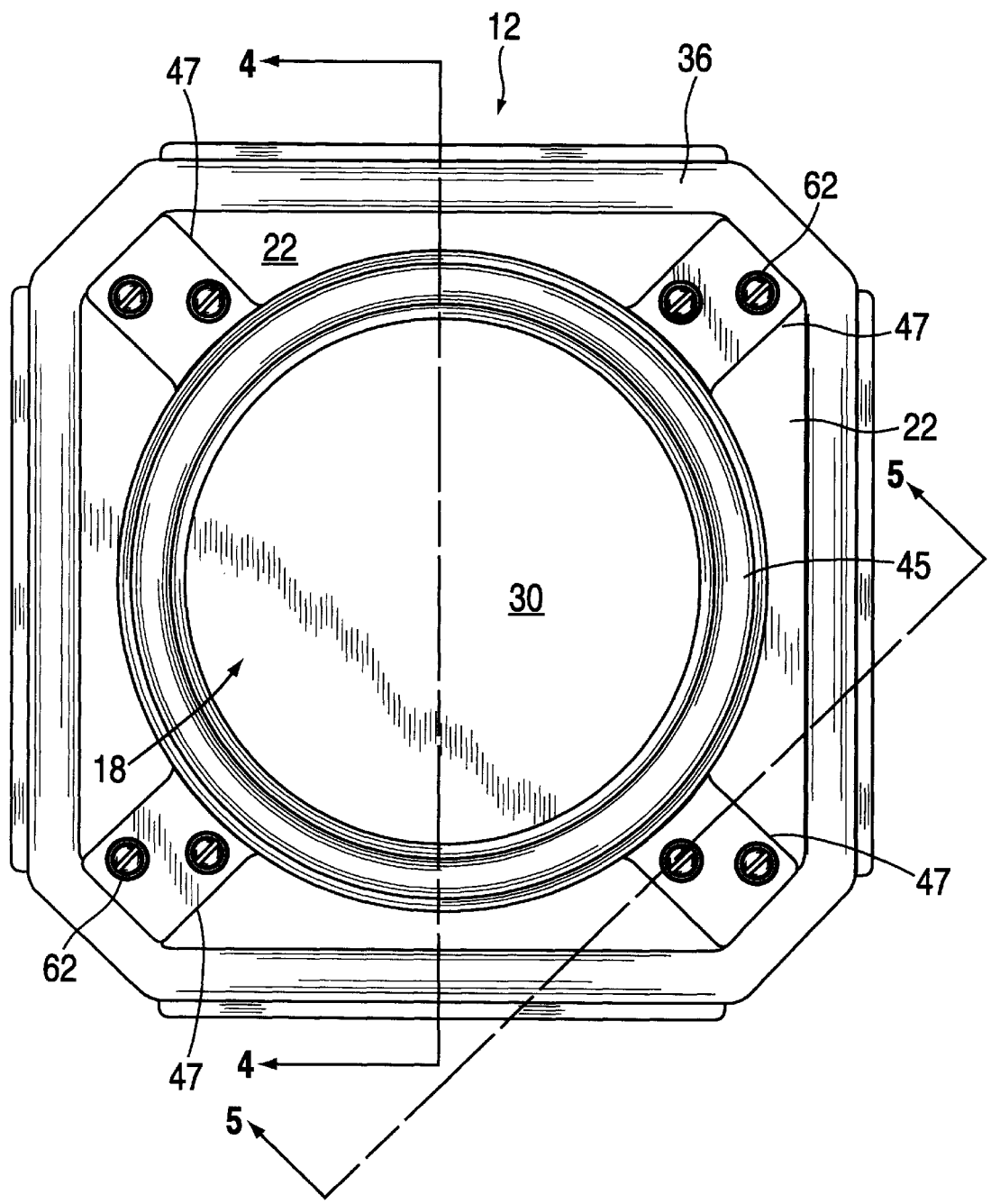
FIG. 2 is a top plan view of the cart of FIG. 1.

Referring now to FIG. 1 of the drawings, the illustrated embodiment of the present invention is represented by a wheeled cart 10 defined generally by a unitary body member 12 having four swivel-mount wheel assemblies 14 coupled thereto. Body member 12 may be formed in any suitable known manner, for example by blow molding or injection molding, preferably of plastic material.

Figure 4:
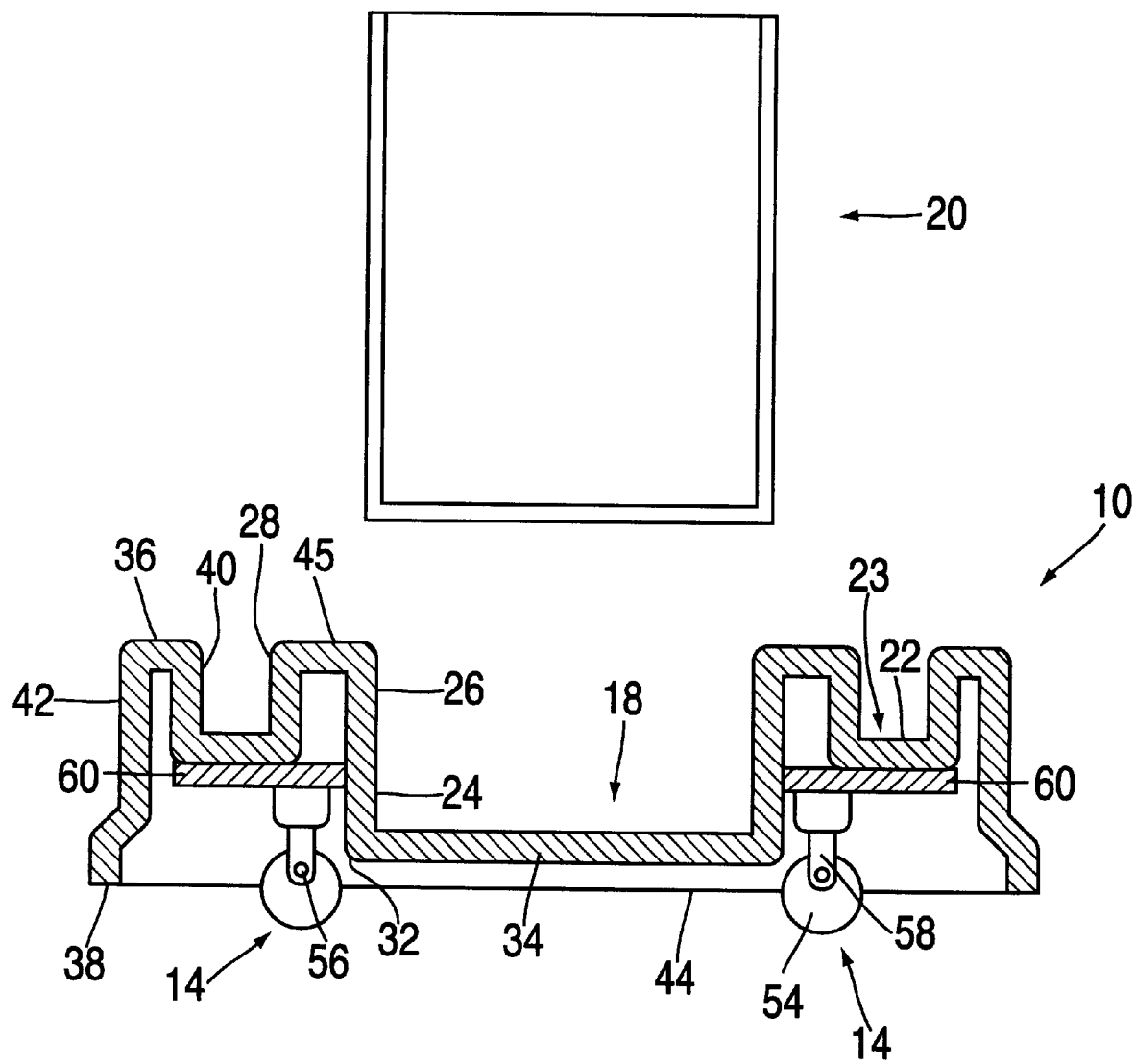
FIG. 4 is a cross-sectional view of the illustrated embodiment of this invention taken along line 4—4 of FIG. 1, with a container, also in cross section, shown properly aligned for engagement with the cart of FIG. 1.

The body 12 of cart 10 includes a peripheral outer skirt 16 surrounding a central circular receptacle 18 that is configured to receive a suitable commercially available container 20 (shown in FIG. 4). Five-gallon molded plastic buckets of the type in which plasterboard wall joint cement is sold, represent a preferable and substantially prototypical container for use with this invention. The removable cover members that seal such containers, as sold, commonly serve as serviceable supports for a seated workperson. Alternatively, cushioned and/or suitably configured seat top attachments, specifically adapted to seat a work person comfortably on such containers, are well known in the art and are readily available on the relvant market at this time.

Outer skirt 16 is interconnected with central receptacle 18 by a substantially planar integral spanning web 22 that extends from the slirt to the receptacle. The cross-sectional representation of FIG. 4 reveals that central receptacle 18 includes a peripheral wall 24 having an inner wall portion 26 and an outer wall portion 28 to which spanning web 22 is coupled. Although inner wall portion 26 and outer wall portion 28 are shown as reversely bent sections of a continuous wall structure, it will be readily understood that peripheral wall 24 may readily be formed as a single thickness wall structure with the inner wall portion and the outer wall portion corresponding to opposite side surfaces thereof, without departing in any way from the disclosure of this invention. The configuration of peripheral wall 24 is considered to be a matter of design choice, determined in general in accordance with the nature of the chosen manufacturing technique.

To support a container 20 within receptacle 18, a bottom structure 30 extends inwardly from inner wall portion 26 proximate the lower peripheral edge 32 of the inner wall. Bottom structure 30 is configured so that at least substantial portions thereof generally lie in a common bottom plane 34 that is positioned in parallel, spaced-apart relationship to the plane of spanning web 22. The bottom portion may be made as a substantially uninterrupted planar disk as suggested in the drawings, or, without departing from the nature of the invention, it may include through openings for drainage or design purposes, or for example, it may include a spoke configuration or other multiple-opening configuration, with or without decorative and/or reinforcing wall elements oriented at an angle to the overall plane of the bottom structure.

Figure 6:
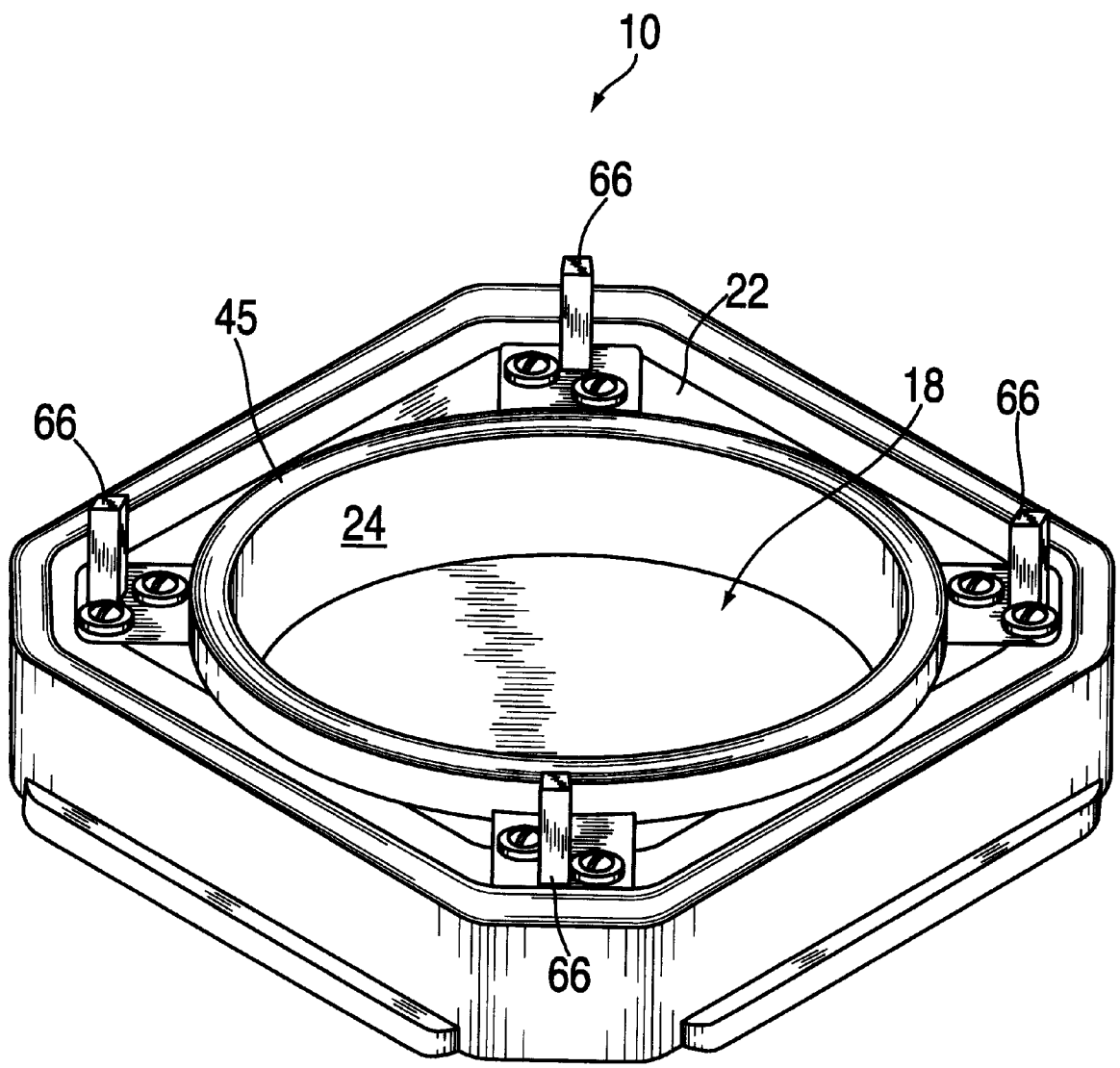
FIG. 6 is a pictorial representation of a further modified embodiment of the wheeled cart of this invention, shown without a container mounted thereon.

As an additional feature of this invention, rectangular storage containers of the type widely identified in industrial applications as "milk-crate" containers may be supported on the embodiment of cart 10 shown in FIG. 6, without eliminating or otherwise affecting the capability of supporting a round container 20 within receptacle 18 as the support of a round container has been explained. In accordance with the embodiment of FIG. 6, a set of rectangular bosses 66 are formed on the upper surface of spanning web 22 so as to project above the common plane defined by upper edge 36 of outer peripheral skirt 16. It is well known that the milk-crate containers available on the market routinely include rectangular mating sockets or receptacles, evenly spaced apart on their lower surface, generally at the four corners thereof, and it is contemplated that the rectangular bosses 66 will be shaped and positioned to mate telescopically with such sockets or receptacles so as to retain and alignamilk crate container [not shown] relative to the cart 10. Although four mounting bosses 66 are shown in FIG. 6, it will be readily understood that any plural number of sockets may be ilk provided consistent with the structure of the milk crate and the secure retention of the milk crate on the cart. It will be understood, similarly, that although bosses 66 are shown formed on and projecting from spanning web 20, they may conveniently project from other surfaces of cart 10 as well, without departing from the scope of this invention. For example, bosses 66 might well project upwardly from the upper edge 36 of peripheral skirt 16, if desired and convenient. The exact location of bosses 66 will may, in general, be selected to correspond with the relative dimensions of the cart and the milk crate, and in this regard, the dimensions of the cart may be adjusted if necessary to accommodate the milk crate. It is important that bosses 66 project, at a minimum, above the upper edge 45 of the wall 24 of receptacle 18, if the dimensions of cart 10 are such that a milk crate container will fit inside the confines of outer peripheral skirt 16; alternatively, the cart may be expanded in dimension so that the outer edges of skirt 16 correspond generally to the outer edges ofamilk crate container, in which case bosses 66 need only project above the upper edge of skirt 16 so as to mate with the receptacles ofamilk crate container.

To aid in understanding the relationship of the elements of the invention, it can be seen that outer peripheral skirt 16 has an upper skirt edge 36, a lower skirt edge 38, an inner skirt portion 40 and an outer skirt portion 42, with at least portions of said lower skirt edge 38 lying in and defining a common skirt edge plane 44. Although inner skirt portion 40 and outer skirt portion 42 are shown as reversely bent sections of a continuous wall structure, it should be understood that the inner wall portion and the outer wall portion may also be formed as opposite side surfaces of a single wall structure without departing in any way from the underlying disclosure of this invention. As explained elsewhere herein, this part of the configuration of outer peripheral skirt 16 is considered to be a design choice depending upon the selected method for manufacturing body member 12.

As shown in FIG. 4, spanning web 22 extends from peripheral outer skirt 16 at a location intermediate upper skirt edge 36 and lower skirt edge 38, so that peripheral outer skirt 16 defines an outer containment wall 46, surrounding the spanning web and having portions extending both above and below the web. Referring again to FIG. 4, bottom structure 30 of receptacle 18 is positioned intermediate the plane defined generally by lower skirt edge 38 and the plane of spanning web 22. Outer wall portion 26 of peripheral wall 24 extends above the surface of spanning web 22 terminating in an upper peripheral wall edge 46, such that inner skirt portion 40 and outer wall portion 28 form opposed, spaced-apart outer and inner containment walls, respectively, positioned on opposite sides of spanning web 22 and rising above the surface of the web, to define between them a contained space serving as a retainer tray 23 for tools and materials.

Figure 5:
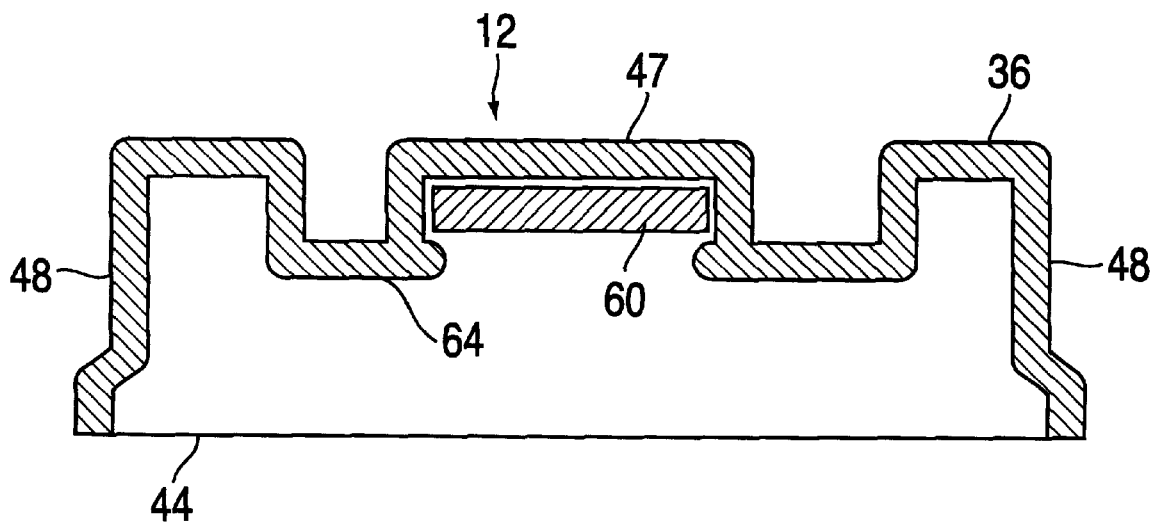
FIG. 5 is a cross-sectional view of a modified embodiment of the invention, taken generally in the direction of line 5—5 of FIG. 1, showing a modified mounting feature.

The functioning of the retainer tray defined in the manner described above is further improved by providing partitions that divide the tray into peripheral sections spaced about the periphery of central circular receptacle 18. As shown in FIGS. 1 and 5, a plurality of integral raised portions 47 of spanning web 22 formed at the four corners 50 [see further description, below] of body member 12 serve as divider-partitions for this purpose.

Figure 3:
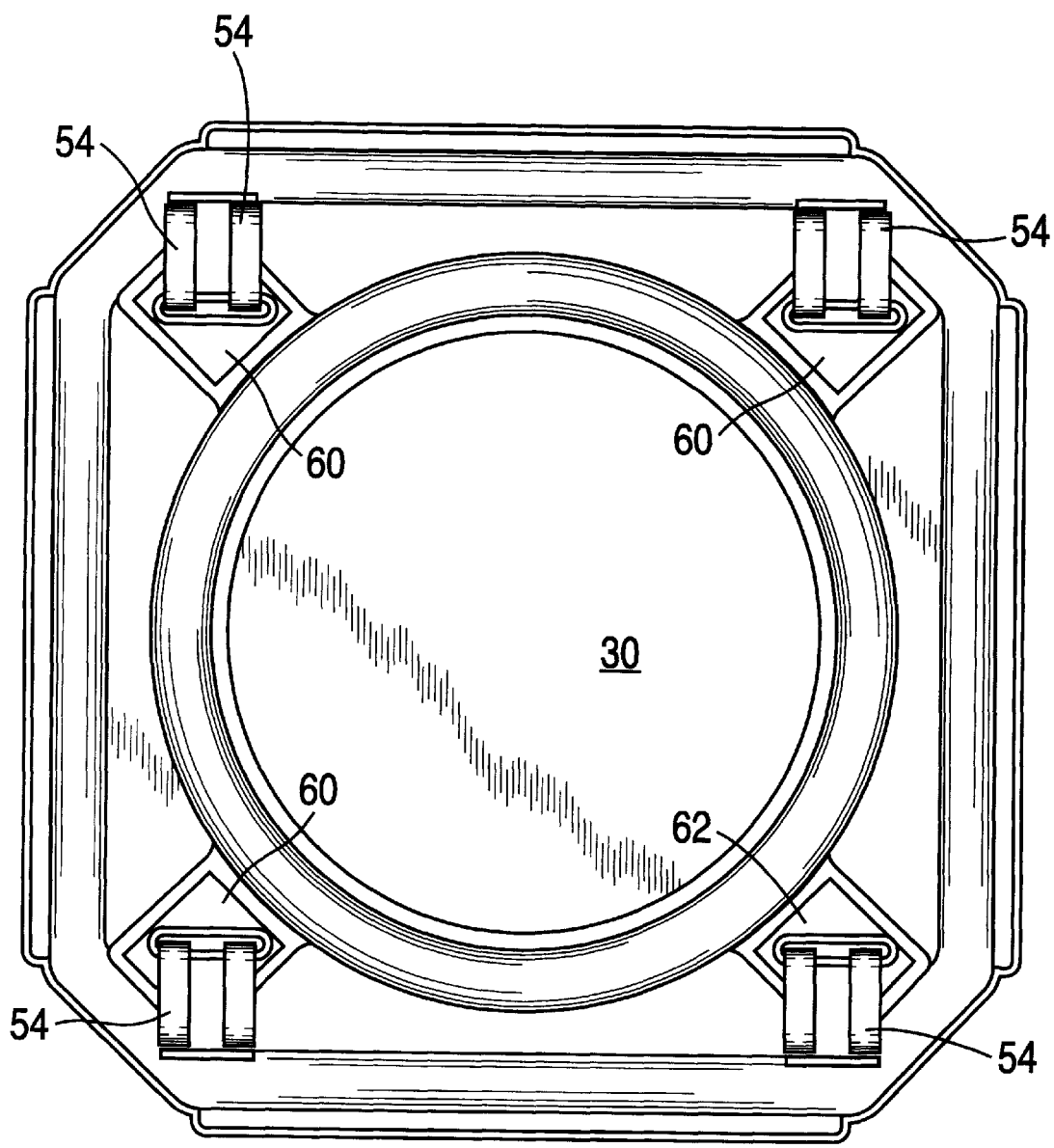
FIG. 3 is a bottom plan view of the cart of FIG. 1, corresponding to the reverse side of FIG. 2.

FIG. 3 illustrates the positioning of swivel-mount wheels 14 on cart 10 in accordance with this invention. Although a four-wheel embodiment is illustrated, those having skill in this art will recognize that a different number of wheel supports may be included. Body member 12 is configured as a four-sided square having four rectilinear outer wall elements 48 defining four corner intersections 50. In the illustrated embodiment, intersections 50 are defined by intersection wall elements 52 that interconnect adjacent ends of rectilinear wall elements 48, forming an obtuse interior angle with each one of the two adjacent rectilinear wall elements. A swivel-wheel assembly 14 of suitable, known design is positioned beneath spanning web 22 within the space defined at each corner intersection 50. The spacing between intersection wall elements 52 and the opposed surface of peripheral wall 26 of receptacle 18 is chosen to provide sufficient clearance for swiveling of wheel assemblies 14 relative to body member 12. In accordance with prior art swivel wheel technology, each swivel-wheel assembly 14 includes a wheel member 54 which is rotatably coupled at a wheel axis 56 to a swivel-axis member 58. In the illustrated embodiment of the invention, each swivel axis member 58 is, in turn, coupled to a mounting plate 60 in swiveling relationship thereto. The mounting plate 60 is securely coupled to spanning web 22 at the under side thereof, to permit swiveling displacement of swivel axis members 58 relative to body member 12, while the wheel assemblies 14 support body member 12 above a floor surface on which the wheels rest. Mounting plates 60 may be coupled conveniently to the underside of raised partitions 47, and the underside of the partitions 47 may be configured to closely surround and position the mounting plates in a desired relative position. Coupling of the mounting plates to the spanning web 22 within the partitions 47 may be achieved by nuts and bolts 62 passing through both the partition and the plate, or as shown in FIG. 5, by resilient mechanical detents 64 formed integrally with body member 12.

Although wheel assemblies 14 are shown having mounting plates 60 for securing the assemblies to the body member, it will be understood by those having skill in this art that other arrangements are possible within the scope of this disclosure. For example, body member 12 may be provided with integral swivel sockets (not shown) at each corner intersection 50, and each swivel axis member 58 may be provided with an upper swivel-shaft portion (not shown) adapted to be received in the swivel socket to allow for swiveling displacement of wheels 54 relative to body member 12.

Referring again to FIG. 4, body member 12 is dimensioned relative to wheel assemblies 14 so that lower skirt edge 38 is supported above a floor on which the wheels rest, at a level generally closer to the floor than wheel axes 60. In this respect, the floor represents a common wheel plane tangent to each wheel at a point most remote from spanning web 22. Positioning skirt edge 38 in this manner allows the skirt to "sweep" the floor as the body member is wheeled about, so as to prevent large scale floor debris from passing under the cart, thereby damaging bottom structure 30 and/or obstructing wheels 54. Further, the positioning of bottom structure 30 close to the wheel plane in effect lowers the center of gravity of the container 20 supported on bottom structure 30, thereby substantially improving the overall stability of the combined bucket-cart combination. Preferably, the plane of bottom structure 30 is positioned between the wheel plane and an imaginary common plane that passes through each of the wheel axes 58. By positioning the plane defined by lower skirt edges 38 substantially coincident with or lower than, i.e. closer to the floor plane than, the plane of bottom structure 58, the "sweeping" action of skirt edges 38 will tend to exclude debris that is higher than the bottom structure from coming into contact with the bottom structure.

Although preferred embodiments of the invention have been illustrated and described, it will be obvious to those having skill in this art that other forms and embodiments of the invention may be visualized without departing substantially from the spirit and scope of the invention set forth in the accompanying claims.

What is claimed is:

1. A movable workseat cart for supporting heavily loaded buckets, comprising:
   a unitary body member having a peripheral outer skirt surrounding a central circular receptacle that is configured to receive a bucket having a circular outer wall, said outer skirt and said central receptacle being connected by an integral spanning web having an upper surface and a lower surface with at least portions of said web lying in and defining a common web plane;
   said central circular receptacle being defined by a peripheral wall having an inner wall portion, an outer wall portion, an upper peripheral edge and a lower peripheral edge, said receptacle being further defined by a bottom structure extending from said inner wall portion proximate said lower peripheral edge, wherein at least portions of said bottom structure lie in and define a common bottom plane positioned in parallel spaced apart relationship to said common web plane;
   said outer peripheral skirt having an upper skirt edge, a lower skirt edge, an inner skirt portion and an outer skirt portion, wherein at least portions of said lower skirt edge lie in and define a common skirt edge plane;
   said integral spanning web extending from the said inner skirt portion intermediate said upper skirt edge and said lower skirt edge such that said skirt forms an outer containment wall surrounding said spanning web, extending both above and below said web; and
   said common skirt edge plane and said common bottom plane being disposed in substantially parallel relationship proximate each other, neither said common skirt edge plane nor said common bottom plane being disposed less than a given distance from said common web plane when said given distance is measured in a direction substantially normal to said common planes;
   at least three swivel-mount wheels of given radius coupled to said integral spanning web proximate said lower surface thereof at equally spaced intervals around said central circular receptacle, said swivel-mount wheels together defining a common wheel plane tangent to each wheel at a point most remote from said spanning web, said common wheel plane being spaced from said common web plane a predetermined distance greater than said given distance, such that the distance between said common wheel plane and each of said common skirt plane and said common bottom plane is not substantially greater than said given radius of said wheels.

2. A movable workseat cart in accordance with claim 1, wherein:
   said spanning web further includes integral divider portions peripherally spaced around the periphery of said central receptacle, said divider portions lying in and defining a common divider plane spaced from said common web plane intermediate said common web plane and said upper skirt edge, such that said portions of said spanning web defining said common web plane are spaced from each other intermediate said divider portions to form separate, spaced apart item trays.

3. A movable workseat cart in accordance with claim 1, wherein:
   said integral spanning web extends from said outer wall portion of said central receptacle intermediate said upper peripheral edge and said lower peripheral edge of said peripheral wall, such that said peripheral wall forms an inner containment wall relative to said spanning web, extending both above and below said spanning web.

4. A movable workseat cart in accordance with claim 1, wherein:
   said outer skirt is defined by a plurality of intersecting rectilinear wall elements and said swivel-mount wheel assemblies are located within the intersections defined by said wall elements.

5. A movable workseat cart in accordance with claim 1, wherein: a plurality of bosses project upwardly from an upper surface of said cart, extending above the said upper peripheral edge of said peripheral wall, said bosses being configured for telescopic reception within mating receptacles in a container separate from said cart.

6. A movable workseat cart in accordance with claim 2, wherein:
   said swivel-mount wheels are coupled to said integral divider portions of said spanning web at said lower surface thereof.

7. A movable workseat cart in accordance with claim 3, wherein:
   said spanning web further includes integral divider portions peripherally spaced around the periphery of said central receptacle, said divider portions lying in and defining a common divider plane spaced from said common web plane intermediate said common web plane and said upper skirt edge, such that said divider portions, said portions of said spanning web defining said common web plane, said inner containment wall, and said outer containment wall, together define a plurality of item trays spaced about the periphery of said central receptacle.

8. A movable workseat cart in accordance with claim 4, wherein:
   said swivel-mount wheels are four in number;
   said outer skirt comprises four rectilinear wall elements that together define four intersections, each intersection having one of said swivel-mount wheels positioned therein; and
   said intersections are formed at least in part by intersection wall elements extending between adjacent ones of said rectilinear wall elements and forming an obtuse angle greater than 90° with each adjacent rectilinear wall element when said angle is measured from said inner surface of said outer skirt.

* * * * *